(12) United States Patent
Mella, Jr.

(10) Patent No.: US 10,531,642 B2
(45) Date of Patent: Jan. 14, 2020

(54) INTEGRATED TRAINING COLLAR AND METHOD OF USE

(71) Applicant: John R. Mella, Jr., Lafayette, LA (US)

(72) Inventor: John R. Mella, Jr., Lafayette, LA (US)

( * ) Notice: Subject to any disclaimer, the term of this patent is extended or adjusted under 35 U.S.C. 154(b) by 498 days.

(21) Appl. No.: 15/220,908

(22) Filed: Jul. 27, 2016

(65) Prior Publication Data

US 2017/0027134 A1 Feb. 2, 2017

Related U.S. Application Data

(60) Provisional application No. 62/197,361, filed on Jul. 27, 2015.

(51) Int. Cl.
*A01K 27/00* (2006.01)
*A01K 15/02* (2006.01)

(52) U.S. Cl.
CPC ............ *A01K 27/004* (2013.01); *A01K 15/02* (2013.01); *A01K 15/021* (2013.01); *A01K 15/029* (2013.01); *A01K 27/009* (2013.01)

(58) Field of Classification Search
CPC .... A01K 15/02; A01K 15/021; A01K 15/029; A01K 15/022; A01K 15/023; A01K 27/004; A01K 27/009
See application file for complete search history.

(56) References Cited

U.S. PATENT DOCUMENTS

| 5,377,626 | A  | * | 1/1995  | Kilsby     | A01K 27/004 119/796 |
| 5,887,550 | A  | * | 3/1999  | Levine     | A01K 27/004 119/796 |
| 6,405,683 | B1 | * | 6/2002  | Walter     | A01K 27/004 119/772 |
| 6,904,872 | B2 | * | 6/2005  | Muller     | A01K 27/004 119/789 |
| 8,151,735 | B1 | * | 4/2012  | McCrocklin | A01K 27/003 119/796 |
| 8,230,822 | B2 | * | 7/2012  | Smith      | A01K 27/004 119/794 |
| 2008/0223308 | A1 | * | 9/2008  | Stern   | A01K 27/004 119/720 |
| 2011/0120388 | A1 | * | 5/2011  | Shahbaz | A01K 27/004 119/796 |
| 2012/0255505 | A1 | * | 10/2012 | Gauthier | A01K 15/021 119/721 |

(Continued)

*Primary Examiner* — Trinh T Nguyen
(74) *Attorney, Agent, or Firm* — MU P.C.

(57) ABSTRACT

Disclosed is an animal training device and method of use. The training device has a housing in communication with a collar. The housing has a clock spring rotatably engaged about a central axis of the housing. A handle provides a user point of contact. a locking mechanism with a plunger and a plunger tube, wherein the plunger extends into the plunger tube. A tether having a first end and a second end, wherein the first end is attached to the central axis, wherein the second end is attached to the handle, and wherein the second end of the tether passes through the locking mechanism and the length of the tether is adjustable as controlled by the locking mechanism. The method comprises use of the training device in creating control and allowing for rapid adjustment of the tether length to correspond to reactions of the animal's response to the commands.

6 Claims, 9 Drawing Sheets

(56) References Cited

U.S. PATENT DOCUMENTS

2014/0041598 A1* 2/2014 Lytle, Jr. .............. A01K 27/004
                                                        119/771
2014/0238314 A1* 8/2014 O'Brien ............... A01K 27/004
                                                        119/796

* cited by examiner

INTEGRATED TRAINING COLLAR AND METHOD OF USE

CROSS-REFERENCE TO RELATED APPLICATION(S)

The present application claims priority to U.S. Provisional Patent Application No. 62/197,361 entitled PET COLLAR OR HARNESS WITH RETRACTABLE LEASH filed on Jul. 27, 2015, the entire disclosure of which is incorporated by reference herein.

BACKGROUND OF THE INVENTION

1. Field of Invention

The present invention relates to the field of tethers, and more particularly to a tether for a domesticated animal.

2. Description of Related Art

Humans have been interacting with domesticated animals for a multiplicity of reasons including companionship and aid. Some of the most common domesticated animals are dogs and cats where their role in daily human life includes companionship, protection, and aid when the animal has been trained to assist a human with mobility, issue detection, and safety. Humans train animals through frequently and repetitively exercising communication, command and control to achieve desired responses from animals. Regardless of the specific use of the animal, a need to maintain physical connection is paramount until behavior responses can be achieved through verbal commands and without a physical connection.

For example, a human takes a dog, not trained to obey a verbal command to heel or perform the desired behavior of walking next to the owner, for walks in public areas. In order to prevent the dog from leaving an acceptable proximity of the owner, a leash is used having a set length to allow for a range of motion for the dog, while the owner maintains a physical connection to the dog in order to control undesired behavior. To train a dog to heel or walk by the owner's side for the purpose of going for walks in public, an owner typically makes connection to the dog with a leash for the purpose communicating desired behavior, establishing verbal commands to the desired behavior and maintaining control during each training session. This is typically done with a 4 to 6 ft tethers or collar and harnesses with built in retractable leashes connected to the animal and held by the owner. The owner grasps the tether at desired points or sets the distance on the retractable leash, to create an optimal distance between the dog and owner giving the owner the ability of using the connection for communicating desired behavior, reinforcing and establishing verbal commands and maintaining control. This practice is conducted frequently and repeatedly on a routine basis or as unwanted behavior occurs to correct or train desired behavior. Successful training is achieved, when the animal can perform desired behavior on verbal command without the use of a tether or leash.

Tethers currently include a static length of material spanning a set distance for connecting to an animal's collar, harness or similar device with the other end being held by the user. The current state of the art, requiring the tether to be connected to a collar, harness or similar device with each use and requiring the user to grasp the tether along various points of the tether to establish the optimum distance in relationship between the animal and owner for proper training or correcting of desired behavior.

Collars and harnesses with built in retractable leashes include a static length of material spanning a set distance with one end connected inside a retractable housing integrated into the collar or harness and a handle on the other end held by the user. The current state of the art, provides for a static leash where the length is predetermined that must be pulled to full draw before a static connection is formed between the animal and the user and it is incapable of being adjusted to the optimal distance between the animal and owner for proper training and behavior correction, as it is simply a length of material between the owner and the animal.

Furthermore, the retractable leash components in current collar and harnesses with built in retractable style leashes, are limited in their dimensions including size weight and shape to meet the functionality of an integrated collar, harness and leash that the animal wears at all times.

A monumental design flaw in the functionality of all collar and harnesses with built in retractable leashes, is that that tethering action relies on applying resistance to the retractor spool as mechanical leash stop and not the leash material or line. For example, the leash material or line must be drawn out to its fullest extent before the retractor is engaged providing a single anchoring point for the entire weight of the connection between the animal and the user. This is a vital flaw in that the leash material or line possessing the tinsel strength required to control the weight of the animal, is unused in place of placing the entire tinsel strength requirement on the limited size and weight limitations of the retractor housing and spool. In this situation, maximum forces not exceeding the tinsel strength of the leash material or line, are transferred to the retractor spool mechanical leash stop.

As a result, a higher potential for failure in the mechanical leash stop failure exists while further limiting the viability and scope of use collar and harnesses with built in leashes for larger animals.

In training a dog, it is crucial to have instant control over actions and reactions of the animal to have frequent and repeated scheduled training sessions using and on the spot sessions when inappropriate behavior occurs. Static leashes can be used to make a connection and used at the proper distance to the dog, but have to be connected with each use, not practical for continuous use and are ineffective for frequent and repeated training or on the spot behavior corrections. Collars and harnesses with built in retractable leashes are effective for continues use but lack the ability to control the leash distance at various distance to support proper training. Having to wait for the full length of leash material to be drawn before control can be exercised is completely ineffective. Furthermore, training aids such as audible devices and tactile stimulation are separate components that require the use of a separate hand for the user to operate.

As part of cognitive learning, animals have certain inherent characteristics and instinctual responses to external stimuli that can be duplicated with effective training but it would require a device to that would allow for an instant connection, frequent and repeated continuous use, and proper communication, command and/or control. Starting at or near their birth, their external environment shapes and conditions their understanding and reactions in order to promote desired behavior of their parents thereby supporting their chances of survival. One of the major factors of their external environment is the control exercised over the animal by their mother and father through cognitive learning control being a frequent and repeated physical connection to the animal exercised by their mother and father, in the wild, through cognitive learning. The ability to communicate, command, and control between animals of the same species incorporates audible commands and physical connection to gain attention or stop unwanted behavior, communication of desired behavior, and a frequent and repeated command and control interaction. Overtime, the juvenile animal learns to appreciate the rational and expected response based on their parent's ability to quickly make a physical connection to communicate desired behavior physically and/or audibly, reinforce command and consistently maintain control.

For example, as part of animal cognitive learning behavior, all dogs and cats are naturally accustomed to a frequent and repeated physical connection to their mothers as she places her mouth on their neck and shoulders, before she physically and/or audibly communicates her desired behavior. It is through this frequent and repeated physical connection to her offspring's neck and upper shoulders, she also establishes her superior to subordinate role and efficiently and effectively implements command and control on a routine basis.

Connecting to her offspring is a natural preparatory action of getting their attention and communicating in and efficient and effective manner. Thus, training through animal cognitive learning is achieved by frequently and repeatedly communicating, commanding and controlling desired behavior on a routine basis. When intermittent unwanted behavior occurs, the mother uses the same physical connection but only for controlling or minimizing unwanted behavior through on the spot training.

In training, it is necessary to understand the difference between command and control. Successful animal training is defined through a clear distinction between command and control of behavior. Commanding requires a superior to efficiently and effectively communicate desired behavior to a subordinate and; the subordinate's ability and willingness to perform desired behavior. Controlling requires a superior to only have the ability stop, minimize or prevent a subordinate from performing undesired behavior.

Ultimately, training between a human and an animal is focused on recreating this interaction of command, communication, and control between the animal and it parents. This is accomplished through repetition of commands accompanied by a positive or negative reaction. Repetition in this sense being the human's ability to instantly make a connection for the purpose of proper training or correct unwanted behavior or the spot frequently and repeatedly enough to achieve desired behavior. This can be done efficiently and effectively with a new device that would allow the user to quickly make a physical connection to pet instinctive cognitive learning through communicating desired behavior physically and/or audibly, reinforce command and consistently maintain control.

The continuous command, communication, and control not only requires adaptability of the length of physical connection between the user and the animal, but also a rapid response mechanism to allow the user to enforce their control immediately without having to establish a set distance. The current state of the art fails in allowing any structure to support such adaptability as the current art is limited to a single style of connection.

Common pet collars and harnesses form a suitable connection at the neck and upper shoulder of dogs and cats, but have a design flaw requiring a tether to be connected before they can be effective tor training desire behavior. Common tethers have design requiring them to be connected to collar or harnesses making them completely ineffective for on the spot training to correct intermittent unwanted behavior and highly inefficient for continuous use to support frequent and repeated routine training. Collars and harnesses with built in retractable leashes, form a suitable connection at the neck and upper shoulder of dogs and cats, but unless they are pulled to the full draw they are ineffective. Furthermore, their lack of distance control, make them ineffective for establishing the optimum distance between the animal and the owner suitable for humans to efficiently and effectively communicate desired behavior in a manner supporting pet instinctive cognitive learning behavior. Additionally, their viability for use with larger animals is limited due to the following reasons; inherent size and weight limitations of all retractor housing to allow the animal to carry the device at all times and their inherent critical design flaw placing the entire tensile strength requirement on the retractor spool leash stop mechanism 28 rather on the maximum tensile strength of the leash material or line.

As a result of these design flaws, humans are typically unable to efficiently and effectively train frequently and repeatedly enough and animals develop common unwanted behavior. These common unwanted behavioral problems are the primary cause of failed pet owner experiences leading to pet abandonment. In lieu of this, owners are typically left with the following options; seek private professional animal behavioral training, seek group professional animal behavioral training or accept the unwanted pet behavior at home and away. As of result of leashes being impractical for use in the home, puppies and kittens are introduced to collar, harness and leash training too late to avoid behavior problems later in life such as hard leash pull from dogs and fear and anxiety to collars, harnesses and leashes in cats.

Based on the foregoing, there is a need in the art for a system providing an effective and collar or harness with a built in retractable and adjustable tether where various characteristics of the tether are adjustable and the user has a plurality of control options from a handle of a comprehensive device. A device is needed to allow a user to connect, communicate, command, control, and train a dog with instant response capability to actions and reaction of the animal.

SUMMARY OF THE INVENTION

In an embodiment, an animal training device comprises a housing in communication with a collar. The housing has a clock spring rotatably engaged about a central axis of the housing. A handle provides for a user interface with the animal. A locking mechanism having a plunger and a plunger tube, wherein the plunger extends into the plunger tube. A tether having a first end and a second end, wherein the first end is attached to the central axis, wherein the second end is attached to the handle, and wherein the second end of the tether passes through the locking mechanism, wherein the tether has a length measured from the housing to the collar, wherein the length of the tether is adjustable, wherein the locking mechanism adjusts the length of the tether.

In an embodiment, the handle is integrated into the housing such that one end of the tether extends from the housing to the collar and the user controls the housing-handle complex by pulling the complex away from the collar while the length of the tether material extends between the complex and the collar.

In an embodiment, the entire device has a range of attributes such as the physical size dimensions, weight, and design that are adaptable for specific use with different size animals. For example, the size of the device is selected to be smaller and weight less for a smaller or juvenile animal. This allows the device to be in constant contact with the animal without presenting negative impact on the actions of the animal.

In an embodiment, the plunger has an opening extending therethrough, wherein the plunger tube has an identical opening extending therethrough, wherein the plunger opening and the plunger tube opening align as the plunger is slidably inserted into the plunger tube, and wherein the tether passes through the opening of the plunger and the opening of the plunger tube when they are aligned.

In an embodiment, the animal training device further comprises one or more buttons, wherein the one or more buttons are in communication with the locking mechanism, wherein the one or more buttons controls depression of the plunger within the plunger tube, wherein the plunger is spring biased against the button control, and wherein misalignment of the plunger opening and the plunger tube opening lock the tether in place.

In an embodiment, the entire locking mechanism is within the housing.

In an embodiment, the animal training device has at least one power source electrically connected to one or more stimulators, wherein the one or more stimulators is selected from the group consisting of: one or more electrical probes, one or more speakers, and one or more vibrators.

In an embodiment, the one or more electrical probes extend between the housing an animal, wherein the animal is in communication with the training device, and wherein the housing is attached to a collar.

In an embodiment, the handle further comprises one or more buttons, wherein the one or more buttons are electrically connected with the at least one power source and the one or more stimulators, wherein the button is depressed to close a circuit between the at least one power source and the one or more stimulators.

In another embodiment, the animal training device further comprises one or more processors, one or more storage media, and a recording devices, wherein the recording device records one or more commands, wherein the one or more commands is stored within the storage media, wherein at least one of the one or more buttons controls recording and playback of the command, and wherein the playback is transmitted through one or more speakers.

In an embodiment, the collar comprises a harness, and wherein the harness comprises one or more magnetic attachments between the housing and the harness.

In an embodiment, a method of training an animal using an animal training device comprising the steps of a user attaching a training device to an animal, wherein a collar engages a neck of the animal, wherein the training device comprises a housing releasably attached to the collar, wherein the housing comprises a clock spring rotatably engaged to a central axis of the housing, wherein a tether extends between the housing and a collar of the training device, and wherein a locking mechanism arrests the passage of the tether from the housing; the user determining a length of the tether to establish a physical connection between the user and the animal; the user adjusting the length of the tether by opening the locking mechanism; the user locking the tether at the determined length; the user giving the animal one or more commands; the animal responding to the one or more commands; and the user reacting to the animals response.

In another embodiment, the method further comprises the steps of the user determining a need for an adjusted tether length; and the user repeatedly adjusting the length of the tether based on the determined adjusted need for the adjusted tether length, wherein the need for the adjusted tether length is determined based on the animal responding to the one or more commands.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
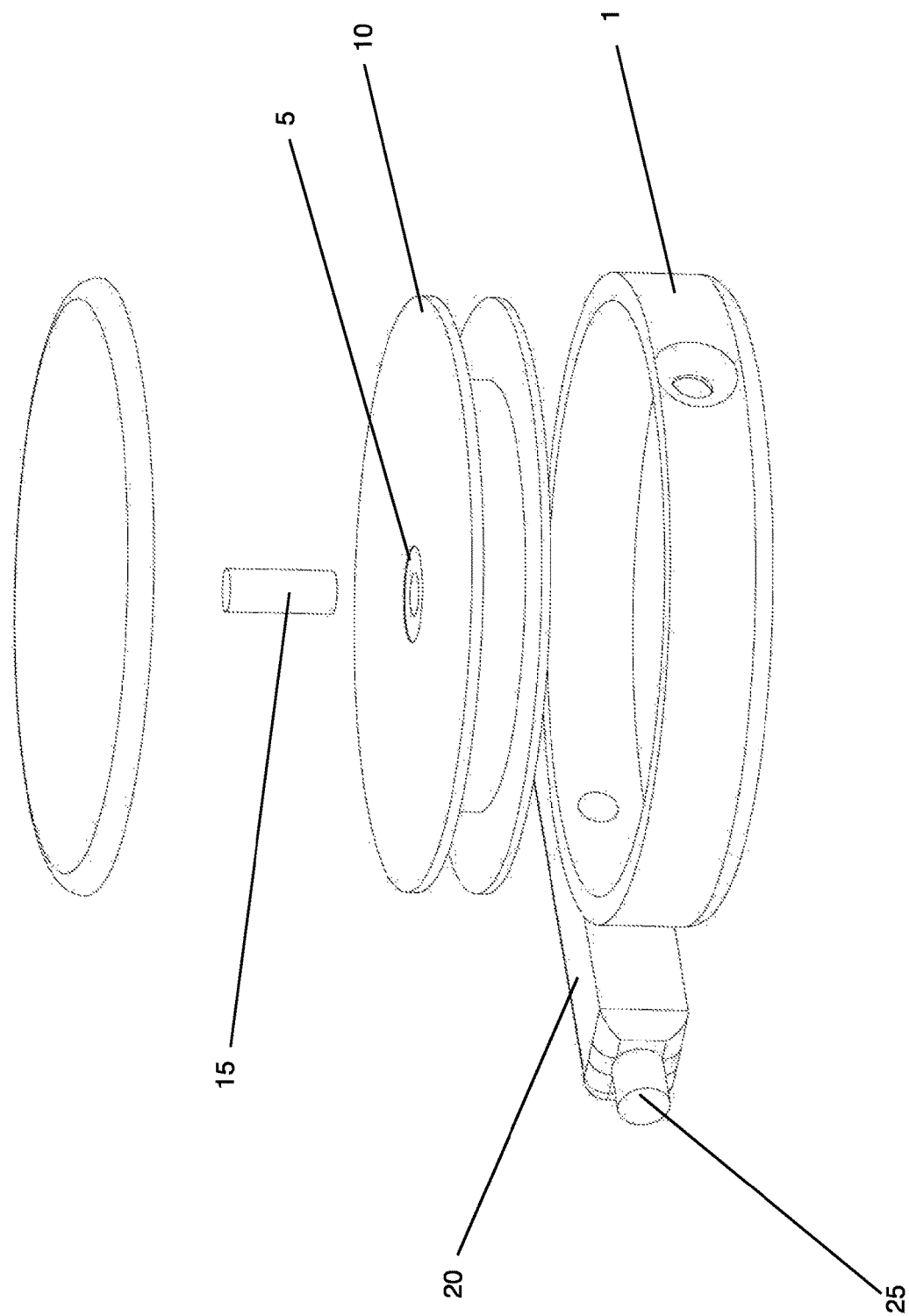
FIG. 1 shows a perspective view of an integrated training collar, according to an embodiment of this invention.
Figure 2:
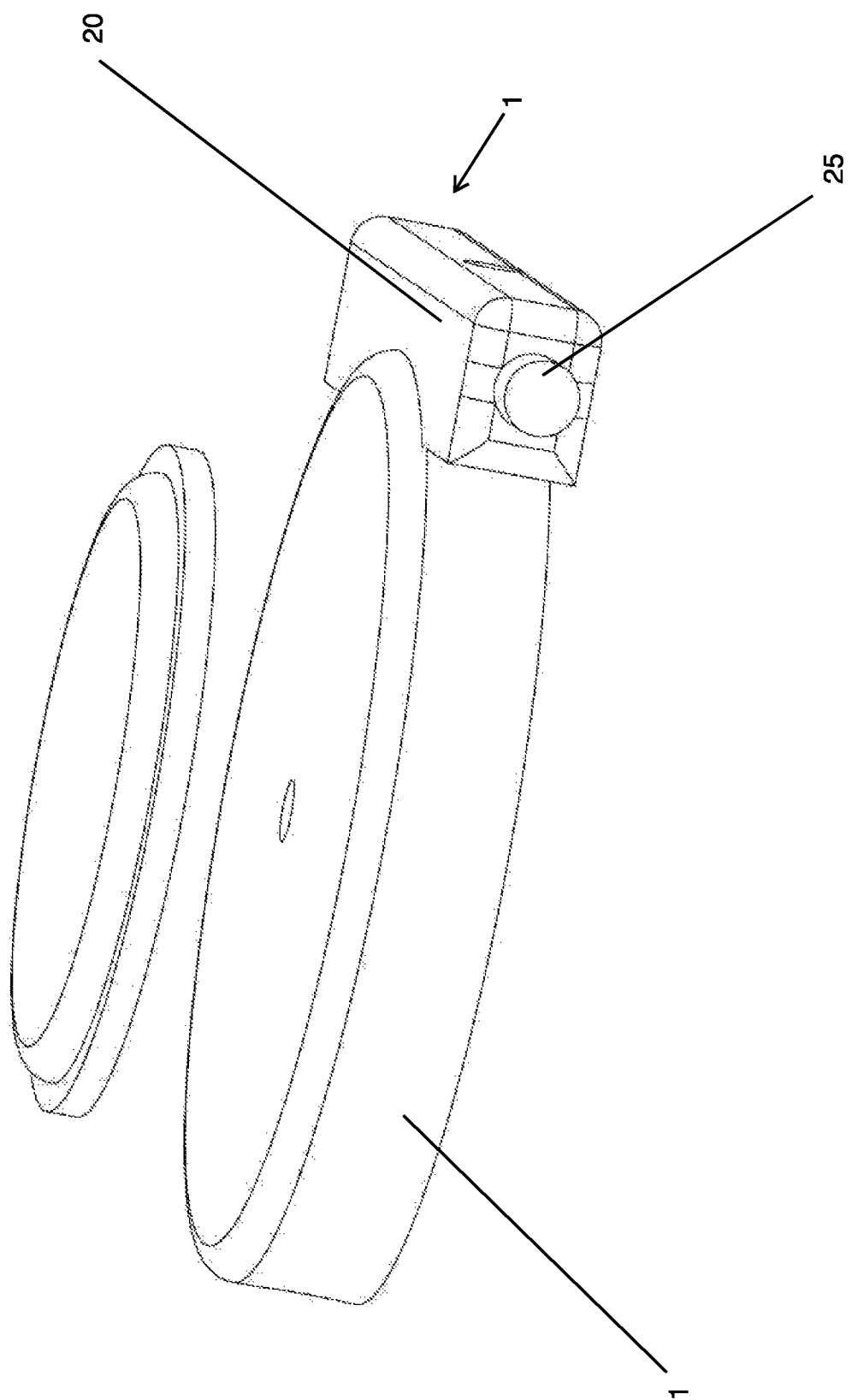
FIG. 2 shows a perspective view of an integrated training collar, according to an embodiment of this invention.

Preferred embodiments of the present invention and their advantages may be understood by referring to FIGS. 1-9, wherein like reference numerals refer to like elements.

A retractable tether has a housing 1 with a plurality of connection points, at least one in communication with the housing 1, one or more internal retractors within the housing 1, a leash stop mechanism 28, leash material engaged with the internal retractor and an attachment means to connect the retractable tether to an animal. The attachment means is in communication with the housing.

In an embodiment, the attachment means has at least one clip and a plurality of attachment points which may be clips or loops to allow for the attachment of accessories such as bags or enrichment devices. Generally, the attachment means is an adjustable length of material having a first end and a second end, where the first end has a first side of a clip and the second end has the received side of the first end clip. In another embodiment, the attachment means is a harness. Both the harness and the adjustable length of material, or collar, are attached to the dog around the neck of the dog or the body of the dog. The retractable tether housing 1 is attached to the attachment means where the attachment means provides an anchor point between the dog and the retractable tether.

In an embodiment, the attachment means has one or more connectors releasably connected to the retractable tether housing 1. For example, the one or more connectors may be magnets or clips, where the attachment means has magnets 35 or clips configured to connect to the magnets or clips of the retractable tether housing 1.

In an embodiment, the internal retractor has at least one clock spring 5 wound about a central axis 15 relative to the internal retractor. The clock spring 5 has a first end and a second end. The first end is in communication with a static point at the central axis 15 and the second is in communication with one or more spools. The one or more spools are generally circular with a channel extending inwardly to the spool around the entire circumference of the spool. The channel is adapted to direct and maintain the position of the leash material 29 on the spool.

In an embodiment, a length of leash has a first end and a second end where the first end is attached to the spool 10. In an initial state, the leash material 29 is wound around the spool 10 as the clock spring 5 biases the spool 10 in an initial state position. In an active state, the second end of the leash material 29 is pulled away from the retractable tether housing 1 and is unwound from the spool 10 against the clock spring 5 bias.

In an embodiment, the second end of the leash material 29 extends outward from an opening in the retractable tether housing 1 and is attached to a handle 20.

Figure 7:
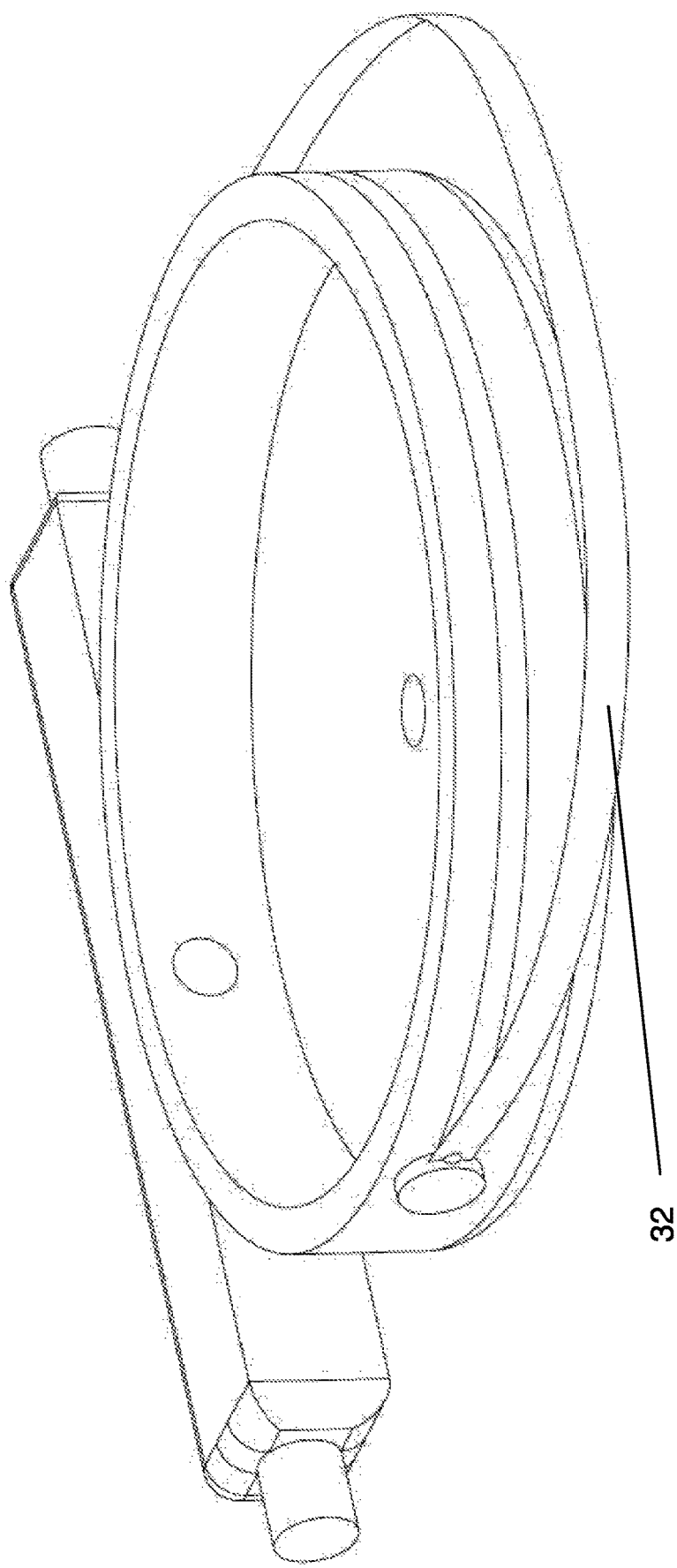
FIG. 7 shows a perspective view of an integrated training collar, according to an embodiment of this invention.
Figure 8:
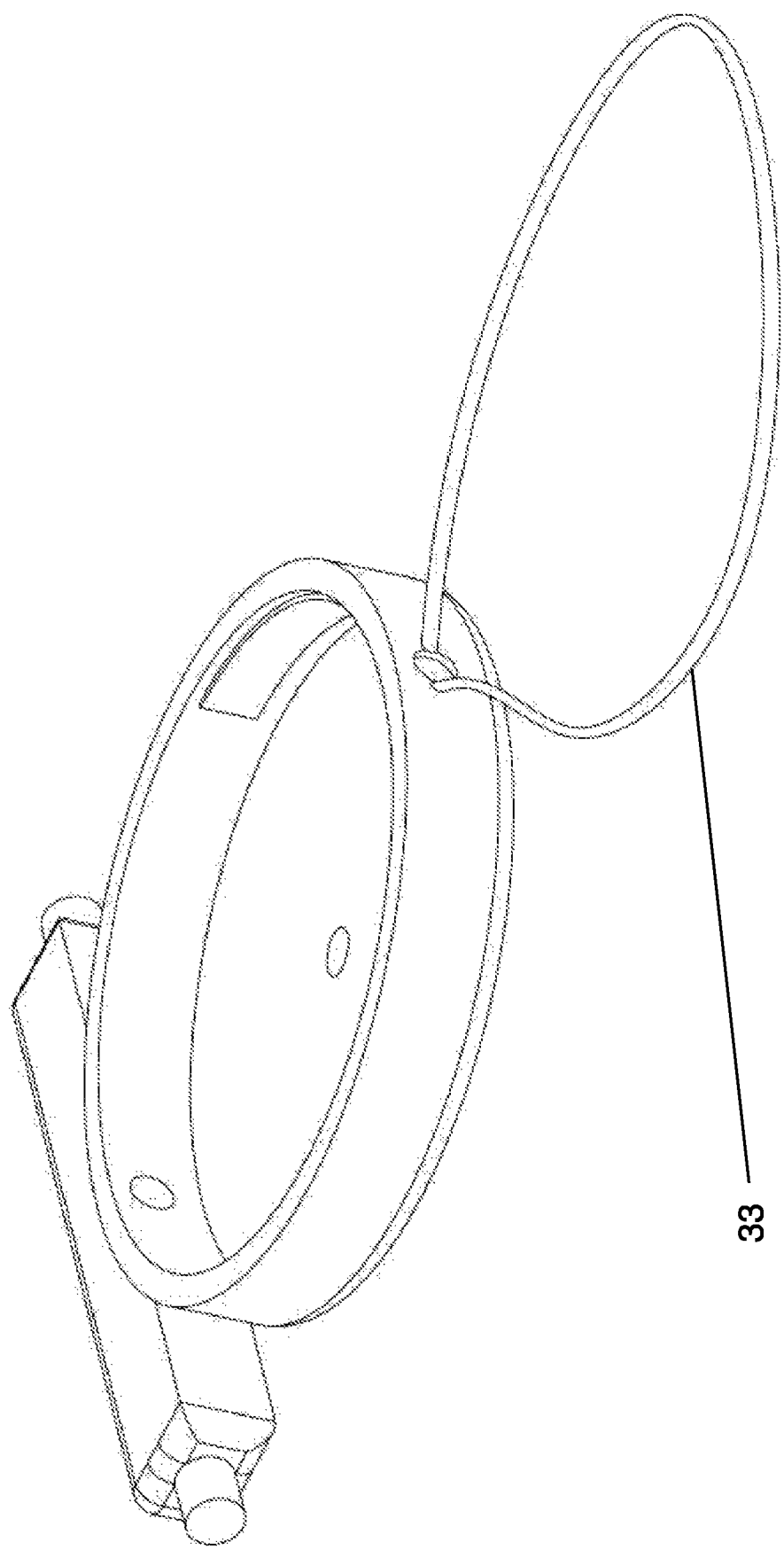
FIG. 8 shows a perspective view of an integrated training collar, according to an embodiment of this invention.
Figure 9:
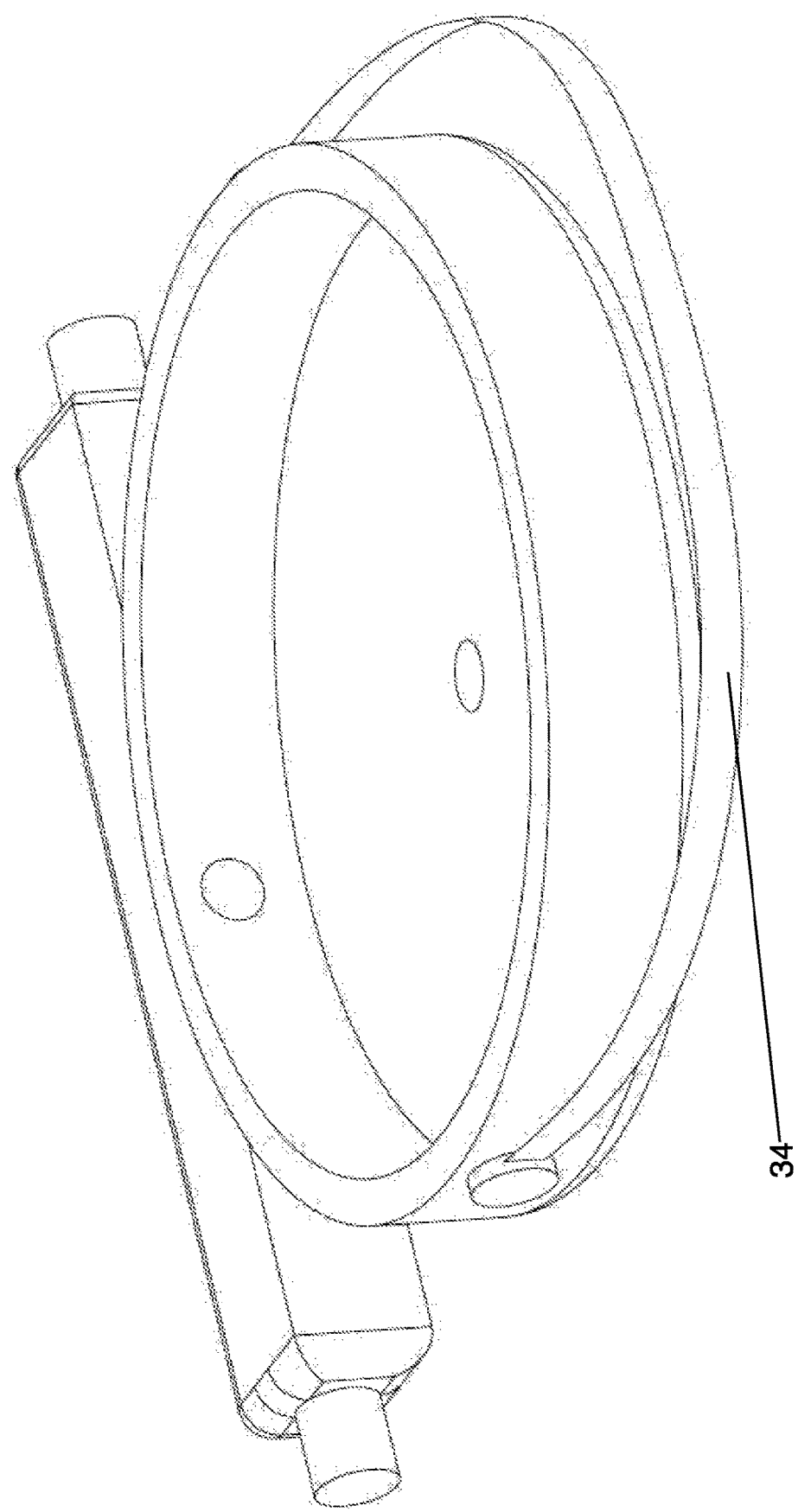
FIG. 9 shows a perspective view of an integrated training collar, according to an embodiment of this invention.

In an embodiment, the retractable tether has one or more lanyards 31 attached to the housing 1. In some embodiments, FIGS. 7-9 illustrate different lanyard embodiments. The lanyards 31, 32, 33, and 34 have a first end and a second end, wherein the lanyard is attached to the housing 1 at each of its ends. In an embodiment, the lanyard is elastic and contours the external shape of the housing 1. When in use, the user grabs the lanyard between the first end and the second end for increased control of the animal through close communication of the housing 1 attached to the animal. In another embodiment, the lanyard is retractable to allow for an increase in useable length between the first end and the second end when in use.

In another embodiment, the lanyard extends from the housing 1 wherein the first and second side of the lanyard are attached to the interior of the housing 1 and wherein the length of lanyard material between the first end and the second end extends out from the housing 1 through an aperture.

In an embodiment, the leash material 29 is a wire extending though the middle of a tubular plastic housing 1. The wire is attached to an interior portion of the handle 20 where the interior portion of the handle 20 comprises a spring-biased plate attached to the second end of the wire. The spring-biased plate is configured to receive pressure from the hand of the user such that the pressure draws the wire through the tubular plastic housing 1. As the wire is drawn through the tubular plastic housing 1, a distal end of the housing 1 actuates a leash stop mechanism 28 or training device held on or within the housing 1 of the retractable tether. For example, the user grasps the handle 20 and, when required, squeezes the handle 20 against the spring bias of the interior portion. As the handle 20 is squeezed, the lock mechanism is engaged and the leash material 29 is prohibited from being removed from the spool 10.

Figure 3:
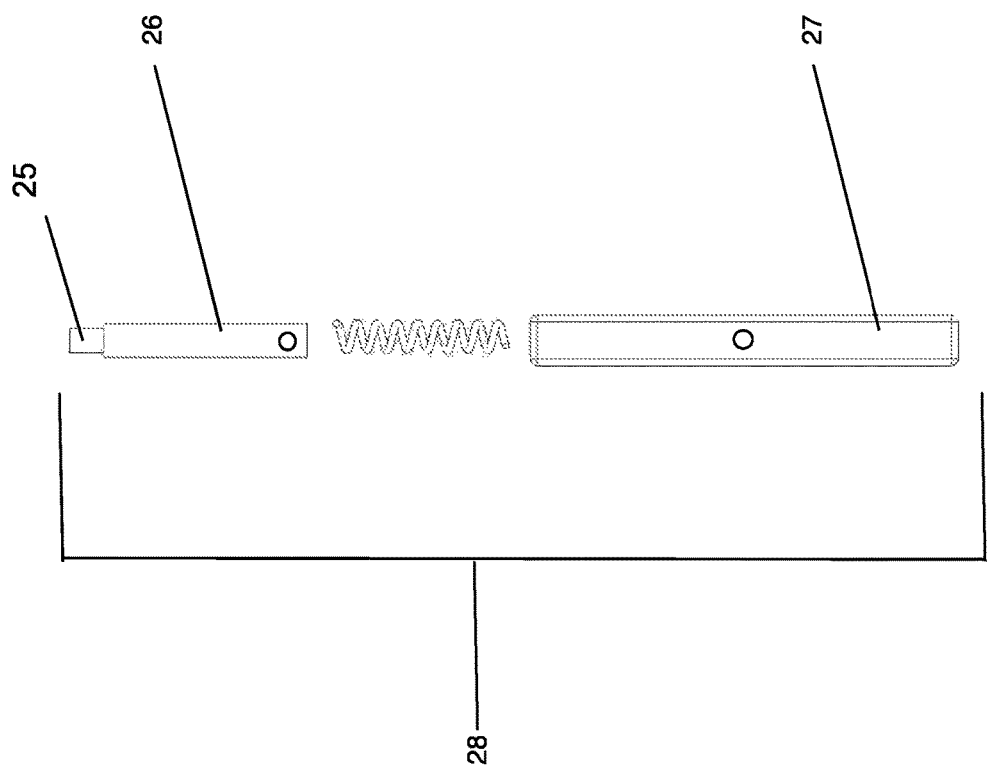
FIG. 3 shows a perspective view of an integrated training collar, according to an embodiment of this invention.

In an embodiment, FIG. 3 shows the leash stop mechanism 28 has at least one button 25 extending through a leash stop mechanism housing. The leash stop mechanism housing is in communication with the retractable tether housing. The button has a contact end and an effective end where the contact end is visible from the outside of the least stop mechanism housing. The effective end extends into the leash stop mechanism housing and contacts a plunger 26 having a head and a body. The plunger body is slidably engaged with a plunger tube 27 such that the plunger head prevents the entire plunger from sliding into the plunger tube 27. Both the plunger 26 and the plunger tube 27 are coaxially aligned and both the plunger 26 and plunger tube 27 have one or more apertures extending therethrough. The one or more apertures of both the plunger 26 and plunger tube 27 have a common circumference. The plunger 26 is in a depressed state when the plunger body is sufficiently within the plunger tube 27 and the center portion of the apertures of both the plunger 26 and plunger tube 27 are sufficiently aligned. The leash material 29 extends through the apertures of both the plunger 26 and the plunger tube 27.

In an embodiment, the body of the plunger extends through the tube such that the end opposite of the plunger head extends beyond the plunger tube.

In an embodiment, the effective end of the button engages the head of the plunger. The leash stop mechanism has one or more springs and at least one of the springs in in communication with the opposite end of the plunger such that the spring biases the plunger towards the effective end of the button. In use, a user depresses the button and the force of the depression is transferred to the plunger to slide the plunger body against the spring bias into the plunger tube such that the apertures of the plunger body and the plunger tube align with one another. With the leash material 29 extending through the apertures, when the button is depressed, the apertures align allowing the leash material 29 to slide through. When the button is released the apertures move out of alignment and compress the leash material 29 passing therethrough. When the leash material 29 is compressed, it is locked in place by the compression.

In another embodiment, the button is depressed such that the plunger slides within the plunger tube and the aperture of the plunger passes the aperture of the plunger tube. In this way, the compression of the line is due to the active depression of the button where the plunger aperture slides beyond the plunger tube aperture compressing the line in an opposite fashion.

In an embodiment, the aperture of the plunger and plunger tube are irregularly shaped. For example, the aperture may have a generally circular or square cross section. In other embodiments, the cross section of the plunger and plunger tube apertures comprises a plurality of ridges or protrusions and corresponding accepting recesses. For example, the plunger aperture has a cross section showing one or more peaks, while the plunger tube aperture has a cross section with one or more troughs in the inverted shape of one or more peaks. With the irregular shape of the apertures, compression of the leash material 29 is enhanced as the surface area contacting the leash material 29 passing through the apertures is increased.

In an embodiment, one end of the spring is in communication with the leash stop housing 1 such that the housing 1 provides a static foundation for the spring force to work against.

In another embodiment, the leash stop housing 1 has a locking clip between the button and the leash stop housing 1 where the button is depressed a first time and the leash stop mechanism is locked in an open state where the aperture of the plunger and the aperture of the plunger tube are generally aligned. When the button is depressed a subsequent time, the locking clip is disengaged and the spring biases the plunger against the button and out of the plunger tube where the leash material 29 is thereby compressed and locked.

In an alternative embodiment, the leash stop mechanism is electrically or pneumatically actuated where the retractable tether has a power source in communication with one or more actuators. A button 20 is provided to close a circuit to operate the actuator, which is in communication with the plunger. The actuator operates to slide the plunger within the plunger tube resulting in the compression and release of the leash material 29 passing therethrough.

In an alternative embodiment, the retractable tether has one or more training devices. For example, the training devices are audible style where the user engages the training device to make a sound, which corresponds with the desired training result; or the training device provides tactile stimulation to the dog through electric shock.

In another embodiment, the handle 20 has a control component to allow the user remote control of the training device on the retractable tether housing 1. For example, the handle 20 has a clicker device where the user depresses a button where the button is a malleable material attached to the interior of the audible device housing 1. When depressed, the malleable material bends against a spring bias until the malleable material overcomes a bend and an audible "click" sound is generated.

In another embodiment, the retractable tether has a power source electrically connected to one or more buttons and to one or more training devices. For example, the training device is an electric shock stimulation and the power source is electrically connected to a button which, when depressed, closes a circuit between the power source, one or more processors, one or more resistors, and one or more probes, where the probes are in communication with the dog. When the button is depressed, the probes transmit a predetermined shock to the dog.

In an embodiment, the retractable tether is used to train an animal. The retractable tether is attached to the dog with the collar or harness attachment. The user provides instructions to the dog in the form of a voice command, unique sound, or gesture. The dog is intended to respond to the instruction under the constructs provided by the user. In this way, the instruction relates to a learned behavior taught to the dog. The dog then carries out the instruction.

In an embodiment, the user can provide subsequent instruction as a signal to the dog that the task has been successfully completed. For example, the user may praise the dog or provide for an audible signal the dog appreciates as an indicator of the task being completed. If the dog deviates from the instruction, the user may act to provide a negative reinforcement through restricting the range of movement of the dog through control of the leash stop mechanism 28, providing an audible response associated with negative behavior, or providing for electric stimulation.

Figure 4:
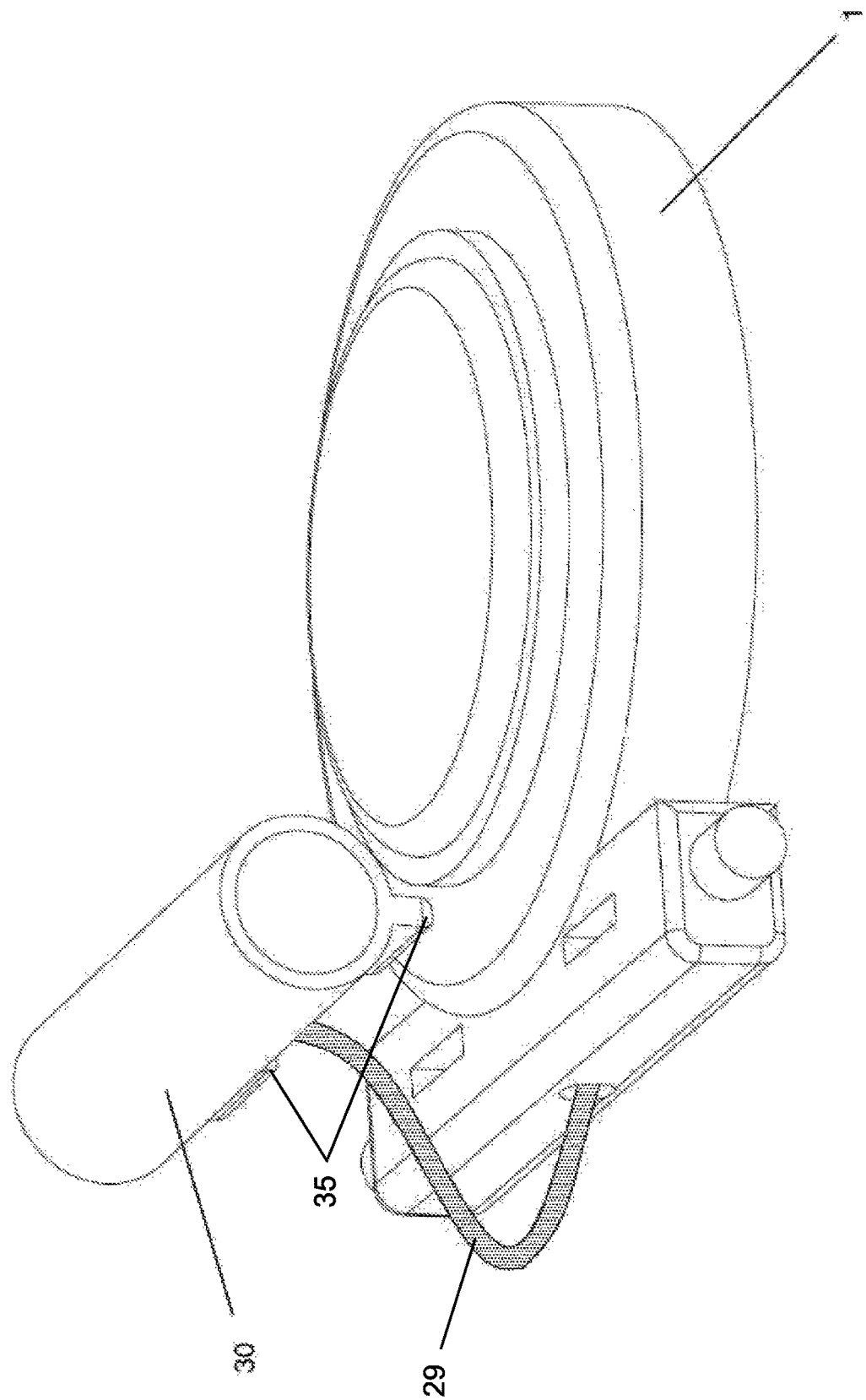
FIG. 4 shows a perspective view of an integrated training collar, according to an embodiment of this invention.
Figure 5:
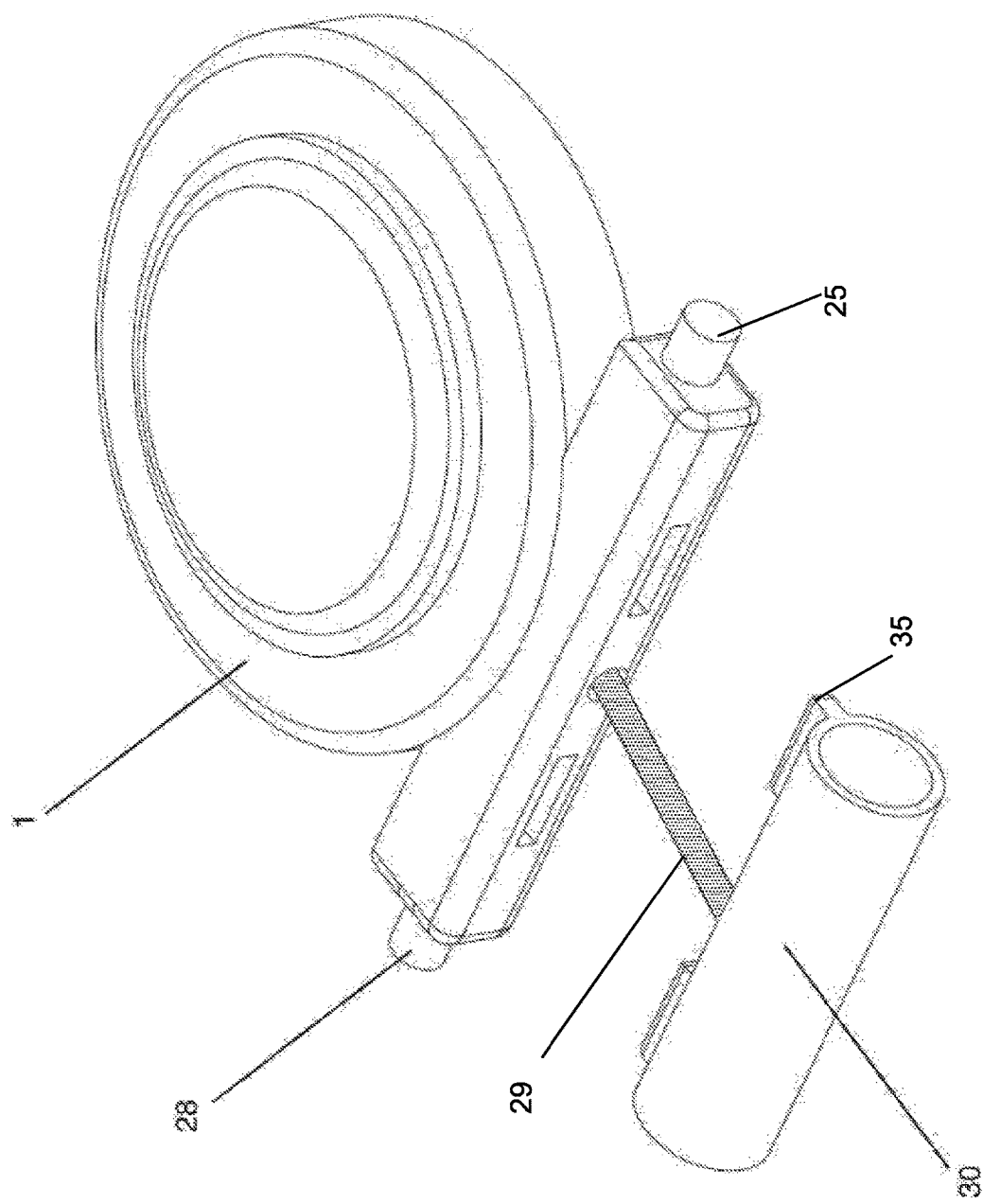
FIG. 5 shows a perspective view of an integrated training collar, according to an embodiment of this invention.
Figure 6:
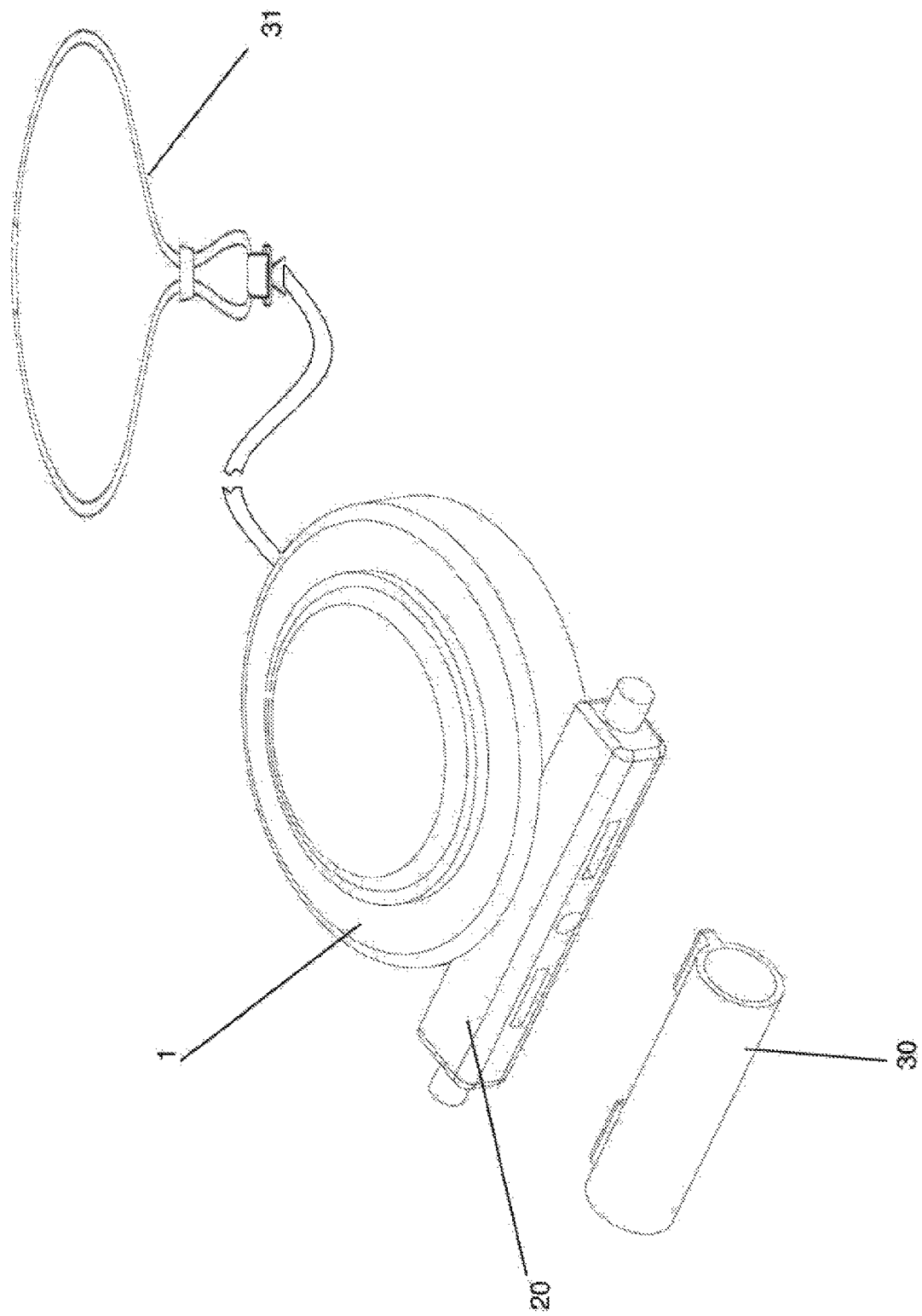
FIG. 6 shows a perspective view of an integrated training collar, according to an embodiment of this invention.

In another embodiment, FIGS. 4, 5, and 6 illustrate the retractable tether housing 1 is releasably attached to a collar or harness. The collar or harness is attached to the animal using one or more clips 30. The one or more clips may include D-rings and straps, snap clips, pressure clips, or friction fit clips. The collar or leach then has an attachment mechanism for accepting the corresponding attachment mechanism of the retractable tether housing 1. The attachment mechanism on the collar or leash.

In an embodiment, the attachment mechanism is a clip that extends outwardly from the housing 1 before forming a generally right angle perpendicular to the outward extension. A second right angle is formed as the clip runs parallel to the exterior surface of the housing 1 where the clip then is angled back towards the housing 1. Before the clip contacts another point on the housing 1, the clip is angled downward in a direction that is generally perpendicular from the outward extension. Ultimately, the sides of the clip whereby a strap from a harness or collar can pass through form a cavity. The third angle of the clip serves to lock the strap from being pulled away from the housing 1. In removing the collar or harness, the strap is either slidingly removed by passing the entire length of the strap through the clip, or the strap may be slid out laterally passing between a space created by one side of the clip and the housing 1.

In an alternative embodiment, the attachment mechanism has two parts where one part is attached to the collar or harness and is the receiving part. The receiving part is either integrated into the collar or the harness whereby the receiving part is either stitched into the collar or harness, or is attached through friction fit or is slidably engages with one or more straps of the collar or harness. One or more sides of the receiving part has an outward projection. The retractable tether housing 1 has a corresponding attachment mechanism and is the insertion part. The insertion part is attached to the housing 1 whereby the insertion part has cavity extending inward to the housing 1 or inward to the insertion part. The projection is configured to a unique shape and the cavity is correspondingly adapted to the negative of the protrusion shape. In use, the protrusion is inserted into the cavity of the insertion part. The protrusion and cavity engage through a friction, snap, magnetic, or locking fit such that the separation of the protrusion and the insertion part require positive action taken to separate the two parts.

In yet another embodiment, the housing 1 and the collar or harness are attached through a magnetic connection whereby the housing 1 is rotatably engaged to the attachment mechanism of the collar or harness and one or more magnets 35 serves to support and bolster the connection between the housing 1 and the collar or harness. In this way, the connection between the harness and the housing 1 allows for rapid connection or interchangeability of retractor housings 1.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:
1. An animal training device comprising:
 a. a housing in communication with a collar comprising
  i. a clock spring rotatably engaged about a central axis of the housing
 b. a collar clip;
 c. a locking mechanism having a plunger and a plunger tube, wherein the plunger extends into the plunger tube, the plunger having an opening extending therethrough, and the plunger tube having an identical opening extending therethrough, the plunger opening and the plunger tube opening aligning as the plunger is slidably inserted into the plunger tube; and
 d. a tether having a first end and a second end, wherein the first end is attached to the central axis, wherein the second end is attached to the collar clip, and wherein the second end of the tether passes through the locking mechanism, the tether passing through the opening of the plunger and the opening of the plunger tube when they are aligned,
 wherein the tether has a length measured from the housing to the collar clip,
 wherein the length of the tether is adjustable, wherein the locking mechanism adjusts the length of the tether.

2. The device of claim 1, further comprising one or more buttons, wherein the one or more buttons are in communication with the locking mechanism, wherein the one or more buttons controls depression of the plunger within the plunger tube, wherein the plunger is spring biased against the button control, and wherein misalignment of the plunger opening and the plunger tube opening lock the tether in place.

3. The device of claim 1, wherein the entire locking mechanism is within the housing.

4. The device of claim 2, wherein the collar clip comprises a harness, and wherein the harness comprises one or more magnetic attachments between the housing and the harness.

5. The device of claim 1, wherein the collar clip comprises a harness, and wherein the harness is received by the collar, the harness having at least one protrusion removably insertable into at least one aperture provided on the housing.

6. The device of claim 5, wherein the at least one protrusion of the harness is further provided with a magnetic tip.

* * * * *